(12) United States Patent
Hodgins et al.

(10) Patent No.: US 9,019,278 B2
(45) Date of Patent: *Apr. 28, 2015

(54) SYSTEMS AND METHODS FOR ANIMATING NON-HUMANOID CHARACTERS WITH HUMAN MOTION DATA

(71) Applicant: Disney Enterprises, Inc., Burbank, CA (US)

(72) Inventors: Jessica Kate Hodgins, Pittsburgh, PA (US); Katsu Yamane, O'Hara Township, PA (US); Yuka Ariki, Tokyo (JP)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,238

(22) Filed: Dec. 2, 2013

(65) Prior Publication Data

US 2014/0085313 A1 Mar. 27, 2014

Related U.S. Application Data

(63) Continuation of application No. 13/115,829, filed on May 25, 2011, now Pat. No. 8,599,206.

(60) Provisional application No. 61/348,099, filed on May 25, 2010.

(51) Int. Cl.
| | |
|---|---|
| *G06T 13/00* | (2011.01) |
| *G09G 5/00* | (2006.01) |
| *G06K 9/62* | (2006.01) |
| *G06T 13/80* | (2011.01) |
| *G06T 13/40* | (2011.01) |

(52) U.S. Cl.
CPC ................. *G06T 13/80* (2013.01); *G06T 13/40* (2013.01)

(58) Field of Classification Search
None
See application file for complete search history.

(56) References Cited

U.S. PATENT DOCUMENTS

| | | | | |
|---|---|---|---|---|
| 2007/0103471 | A1* | 5/2007 | Yang et al. | 345/473 |
| 2007/0146371 | A1* | 6/2007 | Dariush | 345/474 |
| 2008/0012866 | A1* | 1/2008 | Forbes | 345/473 |
| 2008/0024503 | A1* | 1/2008 | Smith | 345/473 |
| 2008/0170076 | A1* | 7/2008 | Giroux et al. | 345/473 |
| 2008/0231640 | A1* | 9/2008 | Pighin et al. | 345/619 |
| 2009/0154796 | A1* | 6/2009 | Gupta et al. | 382/159 |
| 2009/0262118 | A1* | 10/2009 | Arikan et al. | 345/473 |
| 2010/0302253 | A1* | 12/2010 | Kipman et al. | 345/473 |
| 2012/0299934 | A1* | 11/2012 | Perlin | 345/473 |
| 2013/0100141 | A1* | 4/2013 | Henson et al. | 345/473 |

OTHER PUBLICATIONS

Gleicher, Michael. "Retargetting motion to new characters." Proceedings of the 25th annual conference on Computer graphics and interactive techniques. ACM, 1998.*

* cited by examiner

*Primary Examiner* — Kee M Tung
*Assistant Examiner* — Zhengxi Liu
(74) *Attorney, Agent, or Firm* — Ference & Associates LLC (57) ABSTRACT

Systems, methods and products for animating non-humanoid characters with human motion are described. One aspect includes selecting key poses included in initial motion data at a computing system; obtaining non-humanoid character key poses which provide a one to one correspondence to selected key poses in said initial motion data; and statically mapping poses of said initial motion data to non-humanoid character poses using a model built based on said one to one correspondence from said key poses of said initial motion data to said non-humanoid character key poses. Other embodiments are described.

20 Claims, 12 Drawing Sheets

SYSTEMS AND METHODS FOR ANIMATING NON-HUMANOID CHARACTERS WITH HUMAN MOTION DATA

CLAIM FOR PRIORITY

This application is a continuation of U.S. patent application Ser. No. 13/115,829, filed on May 25, 2011, which claims priority to U.S. Provisional Patent Application Ser. No. 61/348,099, filed on May 25, 2010, both of which are incorporated by reference herein.

FIELD OF THE INVENTION

The subject matter described herein generally relates to non-humanoid character animation.

BACKGROUND

Keyframing has been almost the only technique available to animate non-humanoid characters. Although data-driven techniques using human motion capture data are popular for human animation, these techniques are generally not applicable to non-humanoid characters for a variety of reasons.

BRIEF SUMMARY

In summary, one aspect provides a method for animation comprising: selecting key poses included in initial motion data at a computing system; obtaining non-humanoid character key poses which provide a one to one correspondence to selected key poses in said initial motion data; and statically mapping poses of said initial motion data to non-humanoid character poses using a model built based on said one to one correspondence from said key poses of said initial motion data to said non-humanoid character key poses.

Another aspect provides a computer program product comprising: a computer readable storage medium having computer readable program code embodied therewith, the computer readable program code comprising: computer readable program code configured to access key poses selected from initial motion data; computer readable program code configured to access non-humanoid character key poses which provide a one to one correspondence to selected key poses in said initial motion data; and computer readable program code configured to statically map poses of said initial motion data to non-humanoid character poses using a model built based on said one to one correspondence from said key poses of said initial motion data to said non-humanoid character key poses.

A further aspect provides a system comprising: at least one processor; and a memory device operatively connected to the at least one processor; wherein, responsive to execution of program instructions accessible to the at least one processor, the at least one processor is configured to: access key poses selected from initial motion data; access non-humanoid character key poses which provide a one to one correspondence to selected key poses in said initial motion data; and statically map poses of said initial motion data to non-humanoid character poses using a model built based on said one to one correspondence from said key poses of said initial motion data to said non-humanoid character key poses.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-E) illustrates examples of animating using human motion for a non-humanoid character.

FIG. 6(A-B) illustrates an example of vertical contact forces before and after optimization for required and actual contact forces.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail to avoid obfuscation.

Embodiments provide techniques for animating non-humanoid characters with human-like motion. A non-humanoid character may include for example inanimate objects, such as a lamp or a piece of furniture, an animal, such as a bird, and the like. To create anthropomorphic motion of a non-humanoid character, an embodiment may use, for example, motion capture data of a human subject acting in the style of a target non-humanoid character. A few key poses are selected from the captured motion sequence as particularly representative, for example as selected by an actor. Corresponding non-humanoid character poses are then created based on these key poses, for example by an animator on a 3D graphics software (animation) system. An embodiment automatically uses the key poses to build a statistical model for mapping of human poses to non-humanoid character poses. An embodiment may generate a sequence of poses by mapping every frame of the motion capture sequence using a mapping function. Finally, an optimization process may be employed to adjust the fine details of the animated motion for the non-humanoid character, such as contact constraints and physical realism.

An embodiment employs a statistical model called shared Gaussian process latent variable models (shared GPLVM) to map a human pose to a non-humanoid character pose. It should be noted that although an embodiment utilizes shared GPLVM, other approaches, for example principal component analysis and linear mapping (PCA), linear interpolation of nearest neighbors (NN), or Gaussian Process (GP) may be utilized. Embodiments may use a small set of key poses, rather than sequences, to learn a mapping function that covers a wide range of behaviors. Embodiments thus allow for actors and animators to create accurate non-humanoid character animation from a sparse set of poses rather than needing to create entire motion sequences, and operate on the view that the dynamics, or velocity information, may best come from the actor's captured motion.

Figure 1:
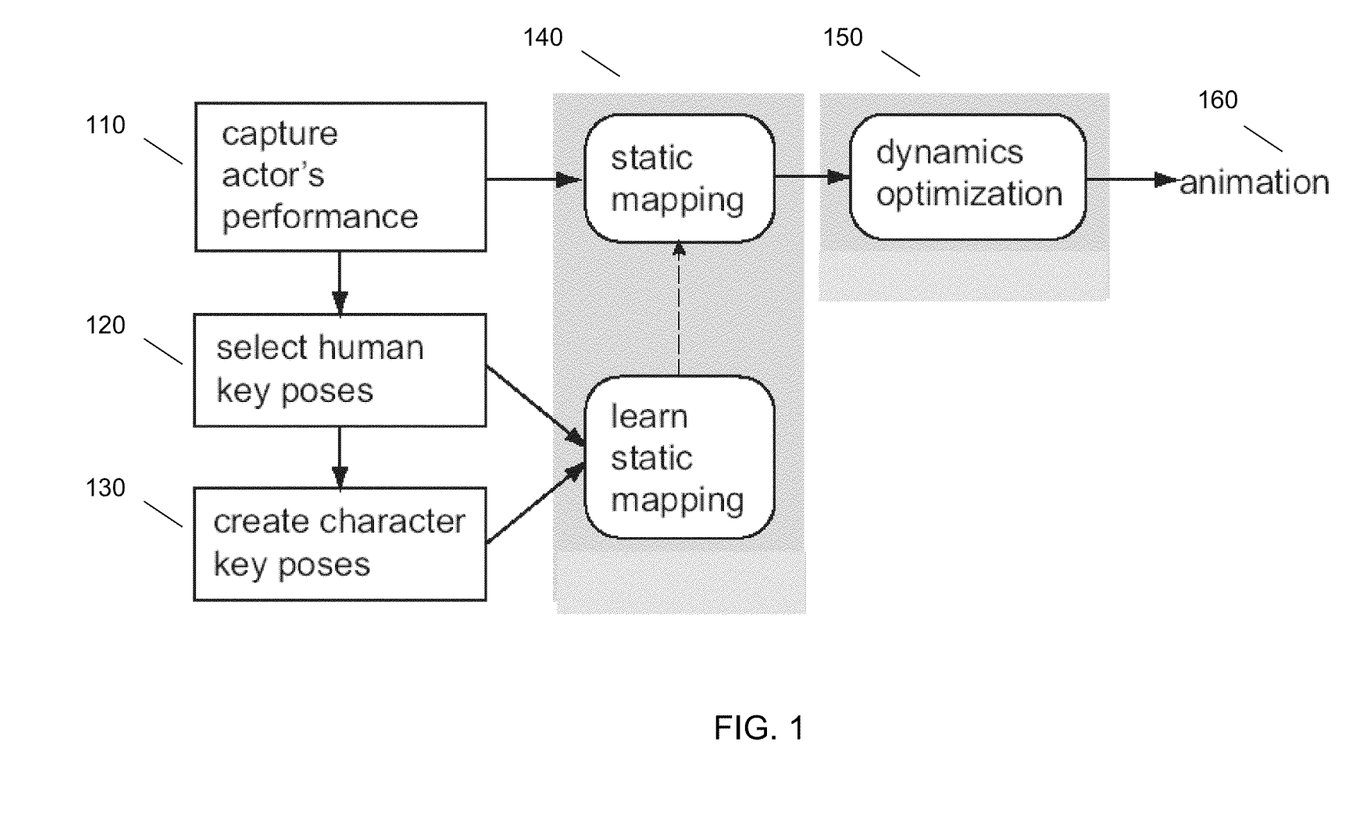
FIG. 1 illustrates an example animation process.

FIG. 1 illustrates an example animation synthesis process. An embodiment first captures motions of a trained actor or actress performing in the style of the target non-humanoid character 110. For example, the actor or actress may be provided with instructions about the capability and characteristics of the non-humanoid character. The talents of the actor or actress may then be relied upon to portray how the non-humanoid character would act in a particular situation.

A few key poses may then be selected. The key poses are selected so that they cover and are representative of the space of all poses that appear in the captured motions 120. A non-humanoid character pose corresponding to each of the selected key poses is then created 130.

If necessary, an animator can operate a 3D graphics software system to manipulate the non-humanoid character pose. It may be desirable for this process to be performed manually because intelligent decisions may be necessary regarding, for example, realizing the same contact states on characters (human vs. non-humanoid) with completely different limb lengths. It may also be desirable to add poses that are not possible for the human body, such as an extreme back bend for a character supposed to be much more flexible than humans are. Nonetheless, the total time and labor required for the above operations are far less than those required for animating the same non-humanoid character by hand. The remaining steps may be completed automatically without any user interaction.

An embodiment uses a statistical model to map the human pose (for example, in each frame) of the captured motion data to a non-humanoid character pose (described further herein) 140. The model may be learned from the given key poses and corresponding non-humanoid character poses. An embodiment may employ a statistical modeling algorithm called shared Gaussian process latent variable model (shared GPLVM).

A mapping function converts frames of the captured motion sequence to a series of non-humanoid character poses. Then the global transformation of the poses is obtained by matching the linear and angular momenta of the non-humanoid character motion to that of the human motion (described further). In many cases, there are still a number of visual artifacts in the motion, such as contact points penetrating the floor or floating in the air. Therefore, optionally a refinement of the motion may be accomplished by correcting the contact point positions and improving the physical realism through an optimization process, taking into account the dynamics of the non-humanoid character 150. The output is animation of a non-humanoid character that is based on human motion but appropriately fit to the non-humanoid character 160.

Static Mapping

An embodiment learns the static mapping of human poses to non-humanoid character poses. An embodiment may employ a statistical method called shared Gaussian latent variable model (shared GPLVM) to learn the static mapping function from a human pose to a non-humanoid character pose. Shared GPLVM is suitable because human poses and corresponding non-humanoid character poses likely have some underlying nonlinear relationship. Moreover, shared GPLVM gives a probability distribution over the non-humanoid character poses, which can potentially be used for adjusting the non-humanoid character pose to satisfy other constraints.

Shared GPLVM is an extension of GPLVM, which models the nonlinear mapping from a low dimensional space (latent space) to an observation space. Shared GPLVM extends GPLVM by allowing multiple observation spaces sharing a common latent space. Similar models have been used for generating images from different viewpoints and mapping human motions to humanoid robot motions.

A main objective of using shared GPLVM in prior work was to limit the output space with ambiguity due to, for example, monocular video. An embodiment may adopt shared GPLVM because the sparse set of corresponding key poses probably does not represent the valid pose space on its own. It can be expected that there is a common causal structure between human and non-humanoid character motions. In addition, it is known that a wide variety of human motions are confined to a relatively low-dimensional space. A model with shared latent space is an effective way to discover and model the space that represents the underlying structure.

The mapping problem involves two observation spaces: the $D_Y$-dimensional human pose space and the $D_Z$-dimensional non-humanoid character pose space. These spaces are associated with a $D_X$-dimensional latent space. In contrast to the existing techniques that use time-series data for learning a model, a challenge here is that the given samples are very sparse compared to the complexity of the human and non-humanoid character models.

Motion Representation

There are several options to represent poses of human and non-humanoid character models. In an example embodiment, the Cartesian positions of multiple feature points on the human and non-humanoid character bodies were utilized. For the human model, motion capture markers may be used because marker sets are usually designed so that they can represent human poses well. Similarly, a set of virtual markers may be defined for the non-humanoid character model, for example by placing three markers on each link of the skeleton, and their positions may be used to represent non-humanoid character poses.

The Cartesian positions are converted to a local coordinate frame to make them invariant to global transformations. It is assumed herein that the height and roll/pitch angles are important features of a pose, and therefore only the horizontal position and yaw angle are canceled out. For this purpose, a local coordinate frame is determined to represent the feature point positions.

For a non-humanoid character (a lamp in FIG. 2), the local coordinate (solid) is determined based on the root position and orientation as follows (referring generally to FIG. 2). It is assumed that two local vectors are defined for the root joint: the front and up vectors (dashed) that point in the front and up directions of the model. The position of the local coordinate is simply the projection of the root location to a horizontal plane with a constant height. The z axis of the local coordinate points in the vertical direction. The x axis faces the heading direction of the root joint, which is found by first obtaining the single axis rotation to make the up vector vertical, and then applying the same rotation to the front vector. The y axis is chosen to form a right-hand system.

For each key pose i, the observation vectors $y_i$ and $z_i$ are formed by concatenating the local-coordinate Cartesian position vectors of the feature points of the human and non-humanoid character models, respectively. Then the vectors for all key poses are collected to form observation matrices Y and Z. The latent coordinates associated with the observations are denoted by X.

Learning and Mapping

Figure 3:
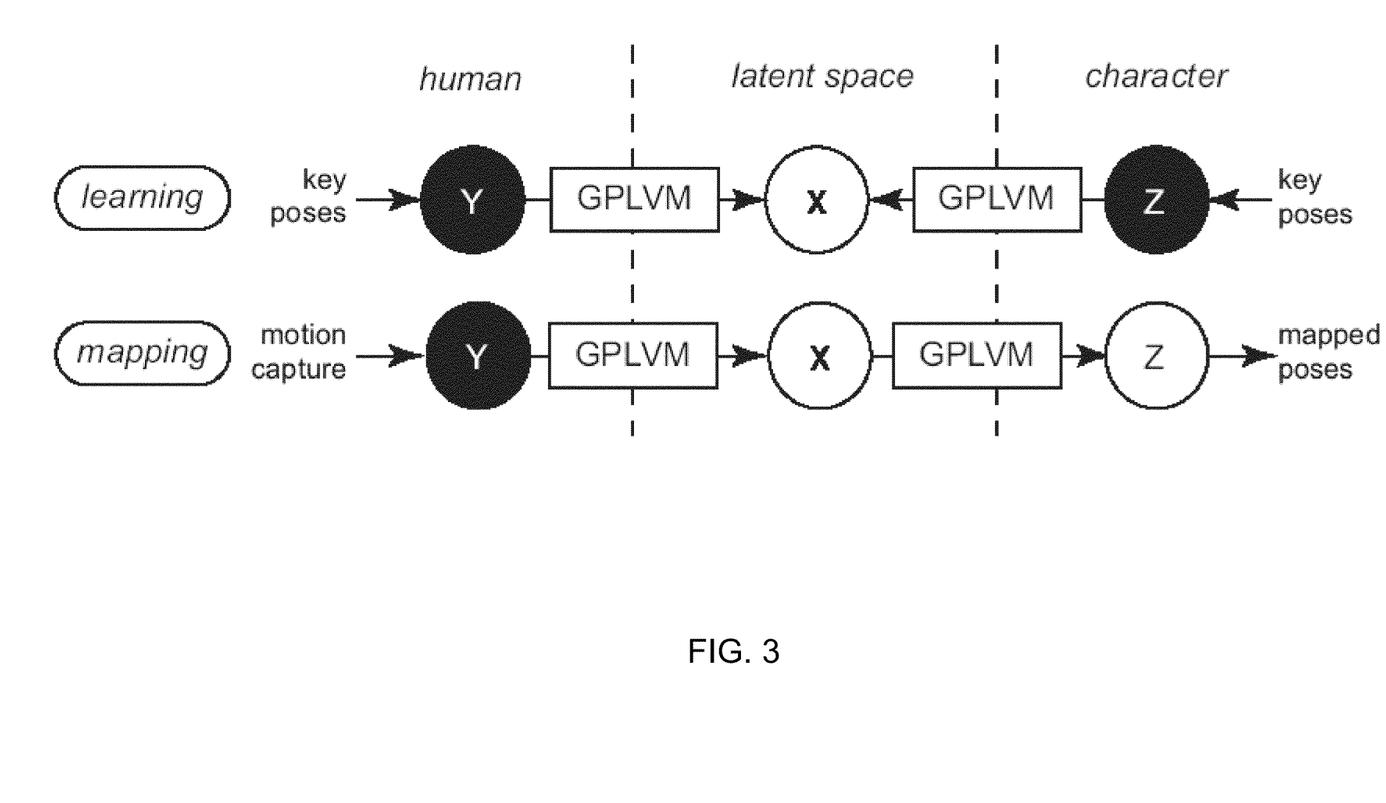
FIG. 3 illustrates an example mapping process.

Example learning and mapping processes are outlined in FIG. 3, where the inputs are drawn with a black background. In the learning process, the parameters of the GPLVMs and the latent coordinates for each key pose are obtained by maximizing the likelihood of generating the given pair of key poses. In the mapping process, the latent coordinates for each motion capture frame that maximize the likelihood of generating the given human pose are obtained. The latent coordinates are then used to calculate the non-humanoid character pose using GPLVM. An issue in shared GPLVM is how to determine the dimension of the latent space. Several criteria that may be used for this purpose are described further herein.

Learning

A GPLVM parameterizes the nonlinear mapping function from the latent space to observation space by a kernel matrix. The (i,j) element of the kernel matrix K represents the similarity between two data points in the latent space $x_i$ and $x_j$, and is calculated by:

$$K_{ij} = k(x_i, x_j) = \theta_1 \exp\left\{\frac{\theta_2}{2}\|x_i - x_j\|^2\right\} + \theta_3 + \beta^{-1}\delta_{ij} \quad (1)$$

where $\Phi = k(x_i, x_j) = \{\theta_1, \theta_2, \theta_3, \beta\}$ are the model parameters and $\delta$ represents the delta function. The parameters of the mapping functions from latent space to human pose are denoted by $\Phi_Y$ and from latent space to character pose by $\Phi_Z$.

Assuming a zero-mean Gaussian process prior on the functions that generates the observations from a point in the latent space, the likelihoods of generating the given observations are formulated as:

$$P(Y|X, \Phi_Y) = \frac{1}{\sqrt{(2\pi)^{ND_Z}|K_Z|^{D_Z}}} \exp\left\{-\frac{1}{2}\sum_{k=1}^{D_Y} y_k^T K_Y^{-1} y_k\right\}$$

$$P(Z|X, \Phi_Z) = \frac{1}{\sqrt{(2\pi)^{ND_Z}|K_Z|^{D_Z}}} \exp\left\{-\frac{1}{2}\sum_{k=1}^{D_Z} z_k^T K_Z^{-1} z_k\right\}$$

where $K_Y$ and $K_Z$ are the kernel matrices calculated using equation (1) with $\Phi_Y$ and $\Phi_Z$ respectively, and $y_k$ and $z_k$ denote the k-th dimension of the observation matrices Y and Z, respectively. Using these likelihoods and priors for $\Phi_Y$, $\Phi_Z$ and X, the joint likelihood can be calculated as:

$$P_{GP}(Y,Z|X,\Phi_Y,\Phi_Z) = P(Y|X,\Phi_Y)P(Z|X,\Phi_Z)P(\Phi_Y)P(\Phi_Z)P(X). \quad (2)$$

Learning shared GPLVM is essentially an optimization process to obtain the model parameters $\Phi_Y$, $\Phi_Z$ and latent coordinates X that maximize the joint likelihood. The latent coordinates are initialized using Kernel Canonical Correlation Analysis (CCA).

After the model parameters $\Phi_Z$ are learned, the probability distribution of the character pose for given latent coordinates x may be obtained by:

$$\bar{z}(x) = \mu_Z + Z^T K_Z^{-1} k(x) \quad (3)$$

$$\sigma_Z^2(x) = k(x,x) - k(x)^T K_Z^{-1} k(x) \quad (4)$$

where $\bar{z}$ and $\sigma_Z^2$ the mean and variance of the distribution respectively, $\mu_Z$ is the mean of the observations, and k(x) is a vector whose i-th element is $k_i(x) = k(x, x_i)$.

Mapping

An example mapping process starts by obtaining the latent coordinates that correspond to a new human pose using a method combining nearest neighbor search and optimization. For a new human pose $y_{new}$, an embodiment searches for the key pose $y_i$ with the smallest Euclidean distance to $y_{new}$. The latent coordinates associated with $y_i$ are used as the initial value for the gradient-based optimization process to obtain the latent coordinates $\hat{x}$ that maximize the likelihood of generating $y_{new}$, that is:

$$\hat{x} = \underset{x}{\operatorname{argmax}} \, P(y_{new}|x, Y, X, \Phi_Y) \quad (5)$$

The latent coordinates $\hat{x}$ are used to obtain the distribution of the non-humanoid character pose using equations (3) and (4).

Dynamics Optimization

The sequence of poses obtained so far does not include the global horizontal movement. It also does not preserve the contact constraints in the original human motion because they are not considered in the static mapping function.

Accordingly, dynamics optimization may be performed to address these issues. For example, the global transformation of the non-humanoid character is first performed based on the linear and angular momenta of the original human motion. Then the contact point positions are corrected based on the contact information. Finally, the physical plausibility is improved by solving an optimization problem based on the equations of motion of the non-humanoid character, a penalty-based contact force model, and the probability distribution given by the static mapping function.

Global Transformation

The global transformation (position and orientation) of the non-humanoid character is determined so that the linear and angular momenta of the non-humanoid character match those obtained by scaling the momenta in the human motion. A global coordinate system whose z axis points in the vertical direction is assumed, and x and y axes are chosen to form a right-hand system.

Figure 2:
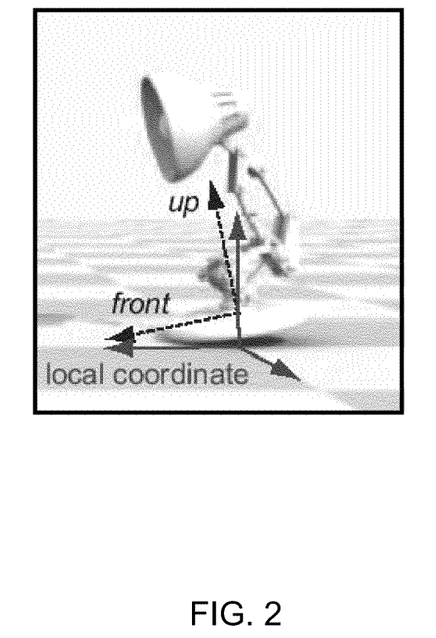
FIG. 2 illustrates an example non-humanoid character and local coordinate system.

This step may determine the linear and angular velocities, v and ω, of the local coordinate frame (described herein in connection with FIG. 2). The linear and angular momenta of the character at frame i in the result of the static mapping are denoted by $P_c(i)$ and $L_c(i)$, respectively. If the local coordinate moves at v(i) and ω(i), the momenta would change to:

$$\hat{P}_c(i) = P_c(i) + m_c v(i) + \omega(i) \times p(i) \quad (6)$$

$$\hat{L}_c(i) = L_c(i) + I_c(i)\omega(i) \quad (7)$$

where $m_c$ is the total mass of the character, p(i) is the whole-body center of mass position represented in the local coordinate, and $I_c(i)$ is the moment(s) of inertia of the character around the local coordinate's origin. Evaluating these equations requires the inertial parameters of individual links of the non-humanoid character model, which can be specified manually or automatically from the density and volume of the links.

Both $v(i)$ and $\omega(i)$ are determined so that $P_c(i)$ and $L_c(i)$ match the linear and angular momenta in the original human motion capture data, $P_h(i)$ and $L_h(i)$, after applying appropriate scaling to address the difference in kinematics and dynamics parameters. A method that may be used to obtain the scaling parameters will be described herein. Given the scaled linear and angular momenta $P_h(i)$ and $L_h(i)$, $v(i)$ and $\omega(i)$ can be obtained by solving a linear equation:

$$\begin{pmatrix} m_c E & -[p(i)\times] \\ 0 & I_c(i) \end{pmatrix} \begin{pmatrix} v(i) \\ \omega(i) \end{pmatrix} = \begin{pmatrix} \hat{P}_h(i) - \hat{P}_c(i) \\ \hat{L}_h(i) - \hat{L}_c(i) \end{pmatrix} \quad (8)$$

where E is the 3×3 identity matrix. Both $v(i)$ and $\omega(i)$ are integrated to obtain the position and orientation of the local coordinate in the next frame. In an example implementation, the horizontal transformation is only considered. That is, linear velocity in the x and y directions and the angular velocity around the z axis are only considered, because the other translation and rotation degrees of freedom are preserved in the key poses used for learning, and therefore appear in the static mapping results. The appropriate rows and columns are extracted from equation (8) to remove the irrelevant variables.

The scaling factors may be obtained from size, mass, and inertia ratios between the human and non-humanoid character models. Mass ratio is $s_m = m_c/m_h$ where $m_h$ is the total mass of the human model. The inertia ratio consists of three values corresponding to the three rotational axes in the global coordinate. To calculate the inertia ratio, the moments of inertia of the human model around its local coordinate, $I_h(i)$, are obtained. The ratio of the diagonal elements $(s_{ix}\ s_{iy}\ s_{iz})^T = (I_{cxx}/I_{hxx}\ I_{cyy}/I_{hyy}\ I_{czz}/I_{hzz})^T$ are used as the inertia ratio. The size ratio also consists of three values representing the ratios in depth (along x axis of the local coordinate), width (y axis), and height (z axis). Because topological correspondence between the human and non-humanoid character models cannot be assumed, an embodiment calculates the average feature point velocity for each model when every degree of freedom is rotated at a unit velocity one by one. The size scale is then obtained from the velocities $v_h$ for the human model and $v_c$ for the non-humanoid character model as $(s_{dx}\ s_{dy}\ s_{dz})^T = (v_{cx}/v_{hx}\ v_{cy}/v_{hy}\ v_{cz}/v_{hz})^T$. Using these ratios, the scaled momenta are obtained as $\hat{P}_h^* = s_m\ s_d^* P_h^*, L_h^* = s_i^* L_h^*$ where $* = \{x, y, z\}$.

Contact Point Adjustment

An embodiment may adjust the poses so that the points in contact stay at the same position on the floor, using the contact states in the original human motion. It is assumed that a corresponding human contact point is given for each of the potential contact points on the non-humanoid character. Potential contact points are typically chosen from the toes and heels, although other points may be added if other parts of the body are in contact. Manual determination of the contact and flight phases of each point may be used, although some automatic algorithms or additional contact sensors may be employed.

Once the contact and flight phases are determined for each contact point, the corrected position is calculated. For each contact phase, an embodiment calculates the average position during the contact phase, and uses its projection to the floor as the corrected position. To prevent discontinuities due to the correction, the contact point positions may be modified while the character is in flight phase by smoothly interpolating the position corrections at the end of the preceding contact phase $\Delta c_0$ and at the beginning of the following one $\Delta c_1$ as:

$$\hat{c}(t) = c(t) + (1-w(t))\Delta c_0 + w(t)\Delta c_1 \quad (9)$$

where c and $\hat{c}$ are the original and modified positions, respectively, and w(t) is a weighting function that smoothly transitions from 0 to 1 as the time t moves from the start time $t_0$ of the flight phase to the end time $t_1$. As an example, an embodiment may use $w(t) = h^2(3-2h)$ where $h = (t-t_0)/(t_1-t_0)$.

Optimizing the Physical Realism

An embodiment may improve the physical realism by adjusting the vertical motion of the root so that the motion is consistent with the gravity and a penalty-based contact model. The position displacement from the original motion is represented along a single axis by a set of N weighted radial basis functions (RBFs). For example, an embodiment may use a Gaussian for RBFs, in which case the displacement $\Delta z$ is calculated as:

$$\Delta z(t) = \sum_{i=1}^{N} w_i \phi_i(t),\ \phi_i(t) = \exp\left\{-\frac{(t-T_i)^2}{\sigma^2}\right\} \quad (10)$$

where $T_i$ is the center of the i-th Gaussian function and $\sigma$ is the standard deviation of the Gaussian functions. As an example, an embodiment places the RBFs with a constant interval along the time axis and sets $\sigma$ to be twice that of the interval. The vector composed by the RBF weights is denoted as $w = (w_1\ w_2\ \ldots\ w_N)^T$.

The optimization may obtain the weights w that optimize three criteria: (1) preserve the original motion as much as possible, (2) maximize the physical realism, and (3) maximize the likelihood with respect to the distribution output by the mapping function. As such, the cost function to minimize is:

$$Z = \tfrac{1}{2} w^T w + k_1 Z_p + k_2 Z_m \quad (11)$$

where the first term of the right hand side tries to keep the weights small, and the second and third terms address the latter two criteria of the optimization. Parameters $k_1$ and $k_2$ are user-defined positive constants.

$Z_p$ may be used to maximize the physical realism and is given by:

$$Z_p = \tfrac{1}{2}\{(F-\hat{F})^T(F-\hat{F}) + (N-\hat{N})^T(N-\hat{N})\} \quad (12)$$

where F and N are the total external force and moment required to perform the motion, and $\hat{F}$ and $\hat{N}$ are the external force and moment from the contact forces.

An embodiment may calculate F and N by performing the standard inverse dynamics calculation and extracting the 6-axis force and moment at the root joint.

An embodiment may calculate $\hat{F}$ and $\hat{N}$ from the positions and velocities of the contact points on the non-humanoid character (described herein), based on a penalty-based contact model. The normal contact force at a point whose height from the floor is z (z<0 if penetrating) is given by:

$$f_n(z, \dot{z}) = \tfrac{1}{2} k_P \left( \sqrt{z^2 + \frac{4f_0^2}{k_P^2}} - z \right) - k_D g(z) \dot{z} \quad (13)$$

$$g(z) = \begin{cases} 1 - \frac{1}{2}\exp(kz) & (z < 0) \\ \frac{1}{2}\exp(-kz) & (0 \le z) \end{cases}$$

where the first and second terms of equation (13) correspond to the spring and damper forces, respectively. When $\dot{z}=0$, the asymptote of equation (13) is $f_n = -k_{pz}$ for $z \to -\infty$, and $f_n = 0$ for $z \to +\infty$, which is the behavior of the standard linear spring contact model with spring coefficient $k_p$. The formulation adopted here smoothly connects the two functions to produce a continuous force across the state space. The constant parameter $f_0$ denotes the residual contact force at $z=0$ and indicates the amount of error from the linear spring contact model. The second term of equation (13) acts as a linear damper, except that the activation function $g(z)$ continuously reduces the force when the penetration depth is small or the point is above the floor. The spring and damping coefficients are generally chosen so that the ground penetration does not cause visual artifacts.

The friction force $f_t$ is formulated as:

$$f_t(r, \dot{r}) = \mu f_n \hat{F}_t \quad (14)$$

$$\hat{F}_t = h(f_{t0}) F_{t0}$$

$$f_{t0} = \|F_{t0}\|, \quad F_{t0} = -k_{tP}(r - \hat{r}) - k_{tD}\dot{r}$$

$$h(f_{t0}) = \begin{cases} \frac{1 - \exp(-k_t f_{t0})}{f_{t0}} & (\varepsilon < f_{t0}) \\ k_t & (f_{t0} < \varepsilon) \end{cases}$$

where r is a two-dimensional vector representing the contact point position on the floor, $\hat{r}$ is nominal position of the contact point, $\mu$ is the friction coefficient, $k_t$, $k_{tP}$ and $k_{tD}$ are user-specified positive constants, and $\varepsilon$ is a small positive constant. Friction force is usually formulated as $\mu f_n F_{t0}/f_{t0}$, which is a vector with magnitude $\mu f_n$ and direction $F_{t0}$. To solve the singularity problem at $f_{t0}=0$, an embodiment may introduced the function $h(f_{t0})$ that approaches $1/f_{t0}$ as $f_{t0} \to \infty$ and some finite value $k_t$ as $f_{t0} \to 0$. The optimization is generally insensitive to the parameters used in equation (14).

The last term of equation (11), $Z_m$, represents the negative log-likelihood of the current pose, that is:

$$Z_m = -\sum_i \log P(z_i) \quad (15)$$

where i denotes the frame number and $z_i$ is the position vector in the observation space formed from the feature points positions of the character at frame i. Function $P(z)$ gives the likelihood of generating a given vector z from the distribution given by equations (3) and (4).

It should be briefly noted that for dynamics optimization, there are many other options for each component. For example, although adjustment of the vertical motion of the root has been described, embodiments may also adjust other directions and/or joints; the displacement may be represented other ways, such as B-spline; a more detailed dynamics model of the non-humanoid character may be employed instead of just linear and angular momentum, et cetera.

EXAMPLES

Embodiments may be used to animate non-humanoid characters such as a lamp, a penguin, a squirrel and the like. For example, a lamp non-humanoid character is an example of character inspired by an artificial object but yet able to perform human-like expressions using the arm and lampshade as body and face. The completely different topology and locomotion style from human topology and style make it difficult to animate this non-humanoid character. A penguin character has human-like topology but the limbs are extremely short, with limited mobility. Although it still does biped walking, its locomotion style is also very different from humans because of its extremely short legs. A squirrel character has human-like topology but may also walk on four legs. The tail may also be occasionally animated during the key pose creation process.

An example software system includes the following components: a C++ code library for reading motion capture data and key poses, converting them to feature point data, computing the inverse kinematics, and evaluating $Z_p$ of the cost function; a publicly available MATLAB implementation of the learning and mapping functions of shared GPLVM; and MATLAB code for evaluating $Z_m$ of the cost function and performing the optimization using the MATLAB function lsqnonlin.

The parameters used in the examples are as follows: for equation (11): $k_1=1\times10^{-5}$, $k_2=1$, for equation (13): $k_P=1\times10^4$, $k_D=1$, $f_0=1$, $k=20$, and for equation (14): $\mu=1$, $k_{tP}=0$, $k_{tD}=100$, $k_t=20$, $\varepsilon=1\times10^{-6}$.

The motions of a professional actor expressing six emotions (anger, disgust, fear, happiness, sadness and surprise) were recorded for each of the three non-humanoid characters mentioned here. Before the motion capture session, the actor was shown a picture of each non-humanoid character and the kinematic properties were explained (for example, no or extremely short legs, may walk on four legs, et cetera). The capture session lasted about two hours.

For static mapping, an example embodiment was trained using a shared GPLVM for each non-humanoid character using the key poses created by the actor and animator. An issue in using GPLVM is how to determine the dimension of the latent space, $D_X$. As an example, two criteria may be used to determine $D_X$.

The first criteria is the error between the given and mapped character key poses. Error generally improved by increasing $D_X$ up to 15, but did not improve much more at $D_X$>15. It was also found that 70 iterations are enough for optimizing the model parameters.

Another desired property is that the non-humanoid character motion becomes continuous when the human motion is continuous. Regarding the dimensions of the trajectories in the latent space when a human motion capture sequence is input to the models, the 2-dimensional space, often used in the literature, is not enough to describe the wide range of postures found in example data sets. Although a 15-dimensional space is enough to reconstruct the training data, the trajectory in the latent space is still jerky and results in unnatural jumps in the non-humanoid character motion. Therefore, a 30-dimensional space may be used.

Figure 4A:
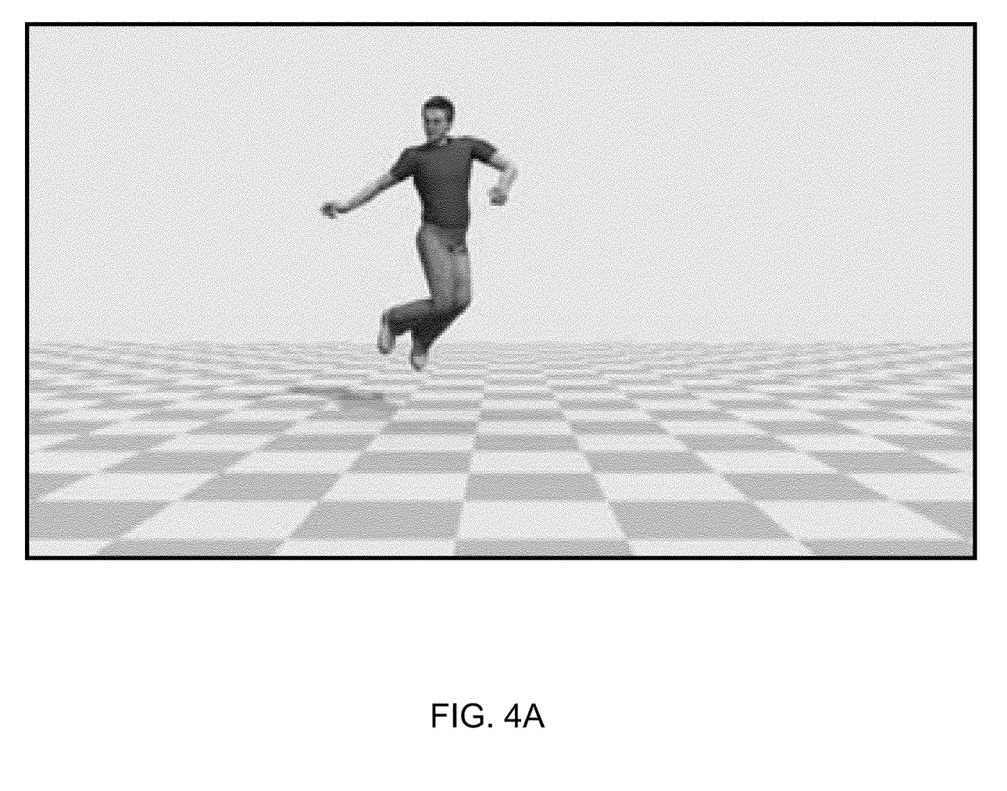
Figure 4B:
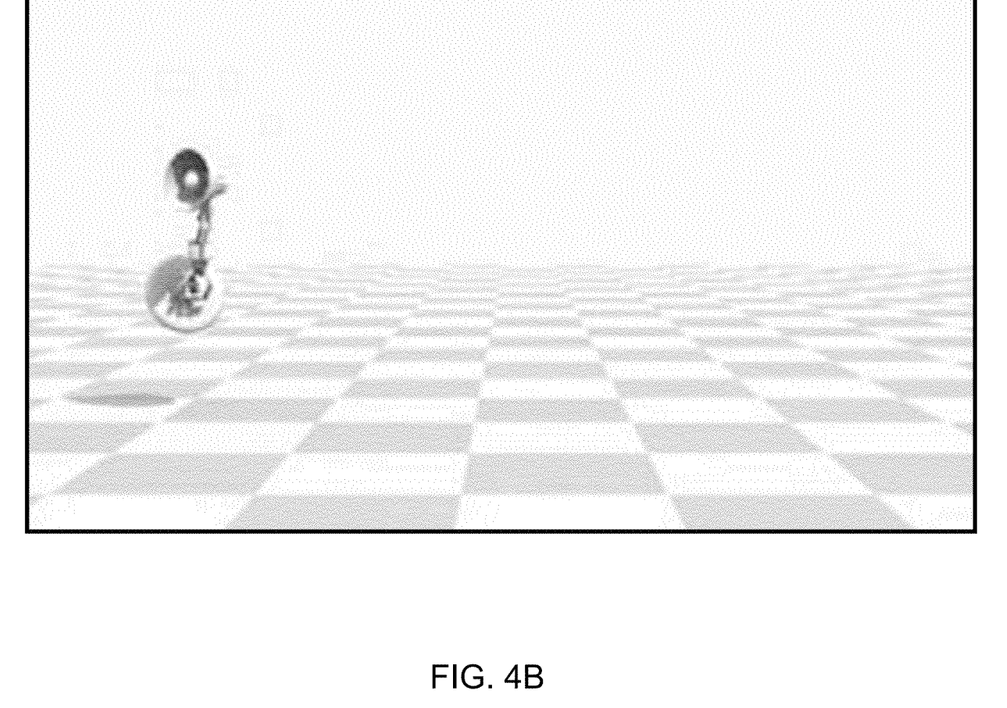

FIG. 4A-B illustrates snapshots of an original human pose and the results of static mapping for a non-humanoid character (a lamp character in this example). Note that the non-humanoid character stays above a fixed point on the floor because the horizontal movement has been removed from the key poses before learning the mapping function. The actor and an animator may work together with a 3D graphics software system to select key poses from the motion capture data and create corresponding poses for the non-humanoid characters.

Figure 4C:
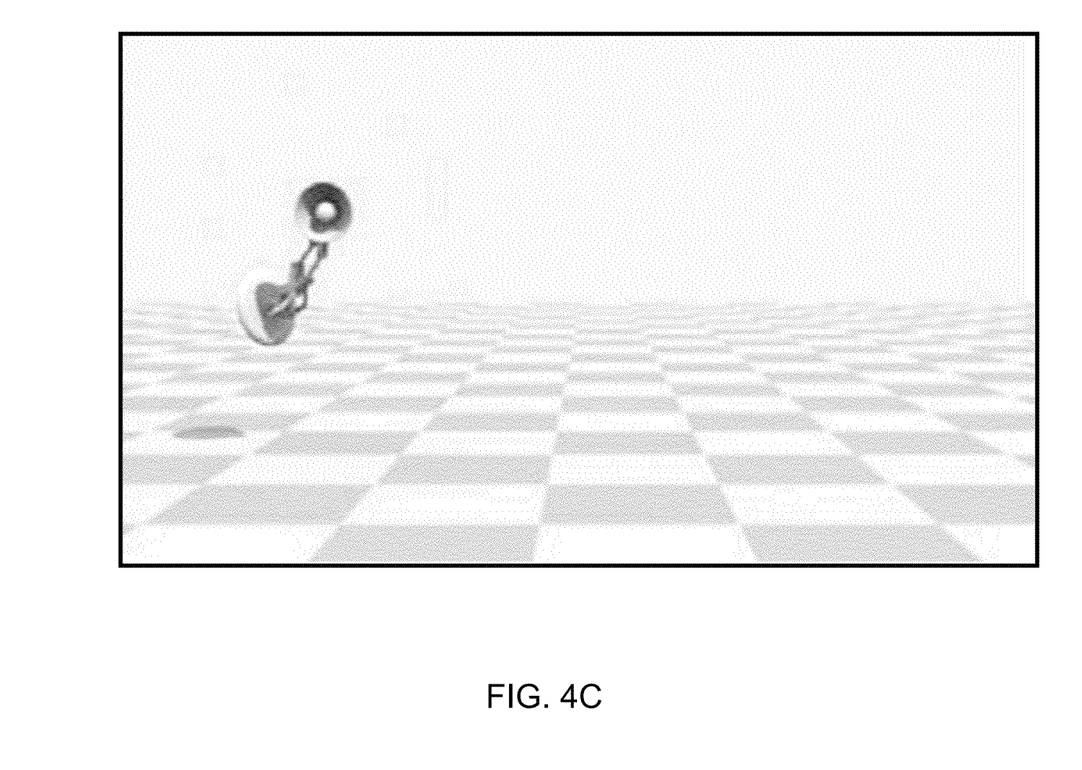
Figure 4D:
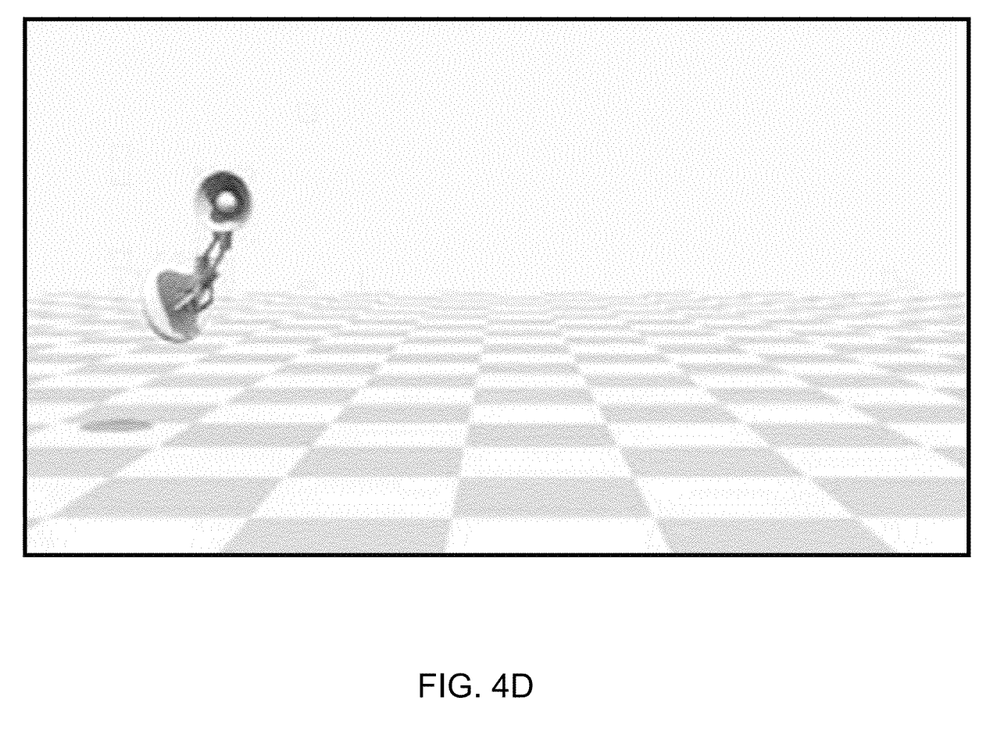
Figure 4E:
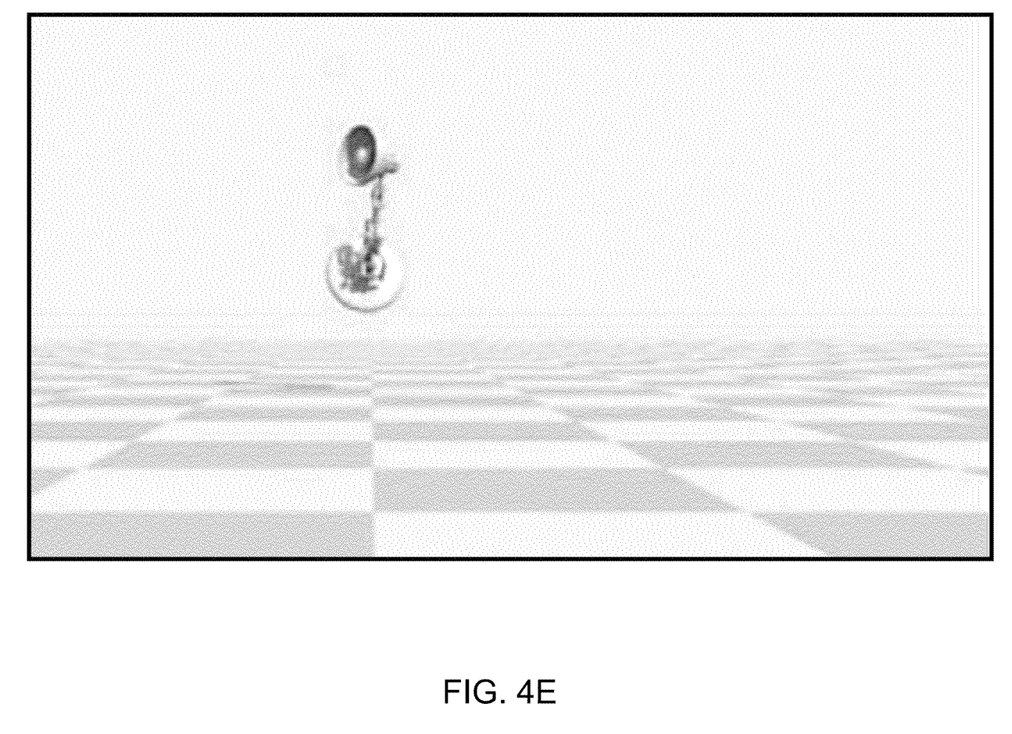

FIG. 4C-E illustrates the results of each step in the dynamics optimization process. First, a horizontal movement is attached to the mapped poses as shown in FIG. 4C. The contact point positions are corrected using the contact state information in the human motion as shown in FIG. 4D. Finally, an optimization process takes place to add physical realism to the motion and the result shown in FIG. 4E.

Figure 5:
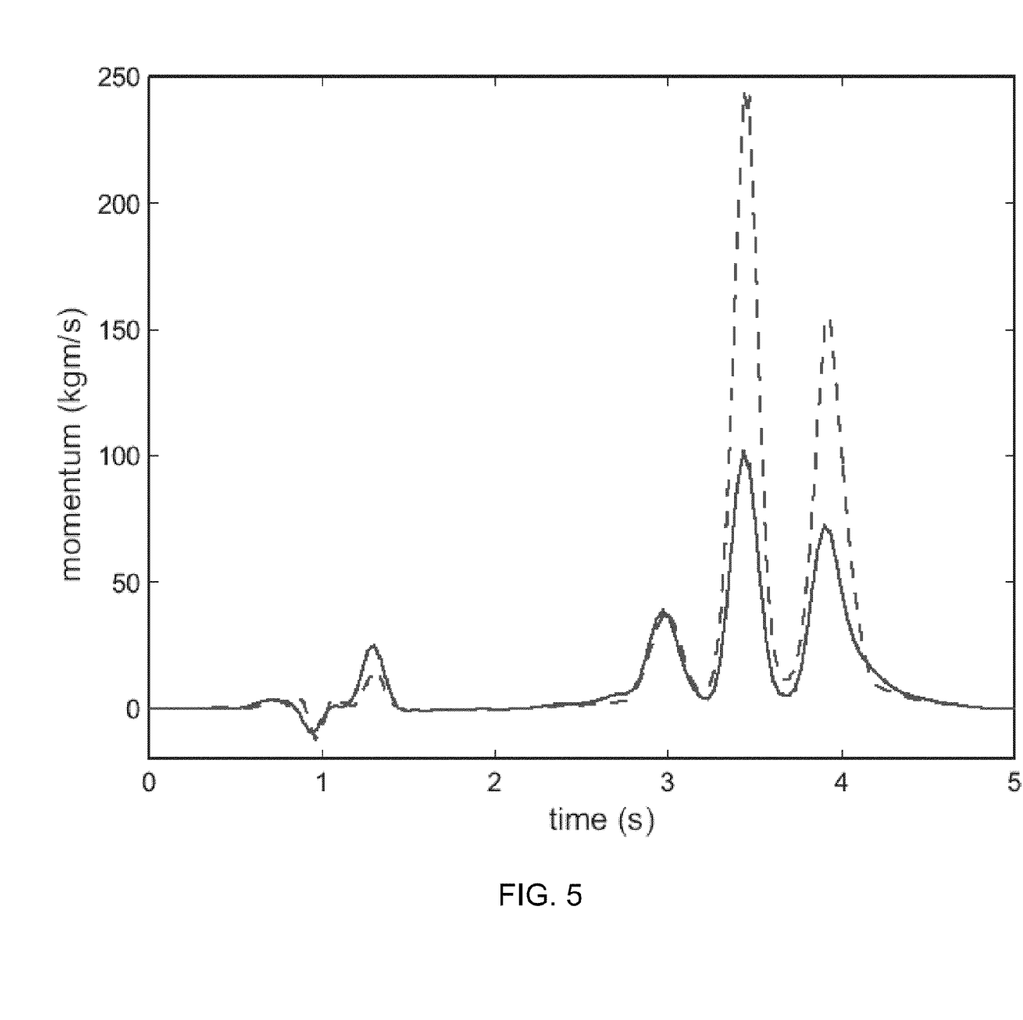
FIG. 5 illustrates an example of linear momentum for scaled human momentum and non-humanoid character momentum.
Figure 6A:
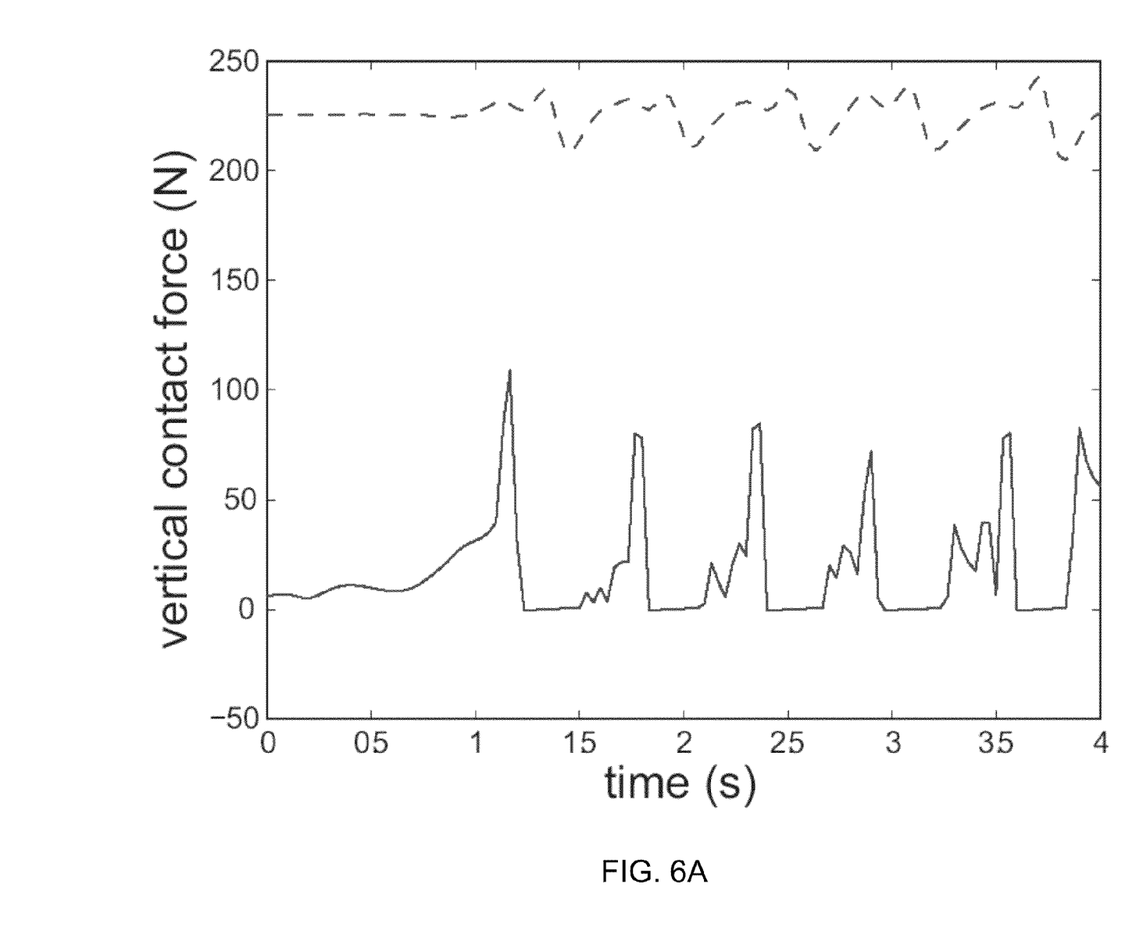
Figure 6B:
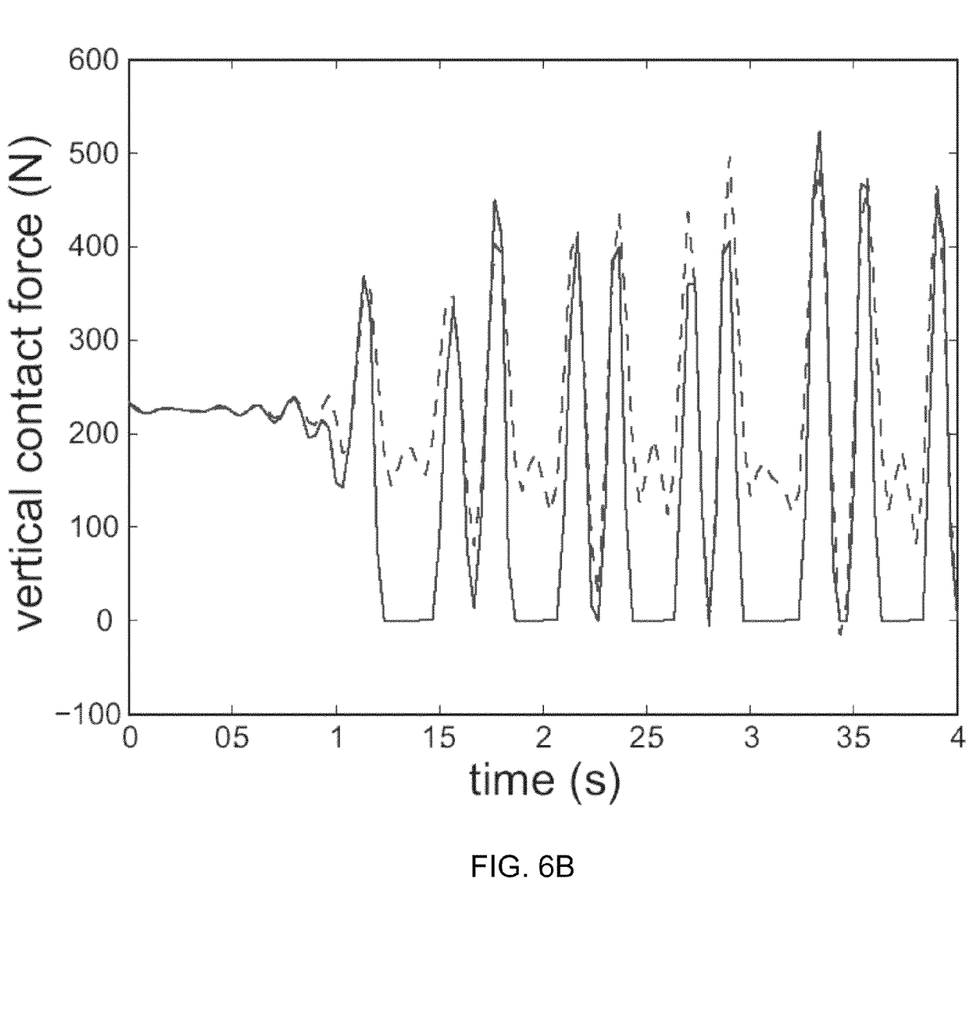

Some of the numerical results during this example process are illustrated in FIGS. 5-6(A-B). FIG. 5 shows the scaled human momentum (dashed line) and non-humanoid character momentum (solid line) in the forward direction. The two graphs in FIG. 6(A-B) show the required contact force (calculated by inverse dynamics) and the contact force from the contact model. FIG. 6(A-B) denotes the forces before (FIG. 6A) and after (FIG. 6B) the optimization. The optimization process tries to match the two forces by modifying the trajectory, which changes both the required (dashed line) and actual contact (solid line) forces.

It should be understood that embodiments may be implemented as a system, method, apparatus or computer program product. Accordingly, various embodiments may take the form of an entirely hardware embodiment, an entirely software embodiment (including firmware, resident software, micro-code, etc.) or an embodiment combining software and hardware aspects. Furthermore, embodiments may take the form of a computer program product embodied in one or more computer readable medium(s) having computer readable program code embodied therewith.

Any combination of one or more computer readable medium(s) may be utilized. The computer readable medium may be a non-signal computer readable medium, referred to herein as a computer readable storage medium. A computer readable storage medium may be, for example, but not limited to, an electronic, magnetic, optical, electromagnetic, infrared, or semiconductor system, apparatus, or device, or any suitable combination of the foregoing. A computer readable storage medium may be any tangible medium that can contain or store a program for use by or in connection with an instruction execution system, apparatus, or device.

Computer program code for carrying out operations of various embodiments may be written in any combination of one or more programming languages (including an object oriented programming language such as Java™, Smalltalk, C++ or the like and conventional procedural programming languages, such as the "C" programming language or similar programming languages). The program code may execute entirely on the user's computer (device), partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an external computer.

It will be understood that certain embodiments can be implemented by a device such as a computer executing a program of instructions. These computer program instructions may be provided to a processor of a special purpose computer, or other programmable data processing apparatus to produce a machine, such that the instructions, which execute via the processor of the computer or other programmable data processing apparatus, implement the functions/acts specified.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified.

The computer program instructions may also be loaded onto a computer, other programmable data processing apparatus or the like to produce a computer implemented process such that the instructions which execute on the computer or other programmable apparatus provide processes for implementing the functions/acts specified.

Figure 7:
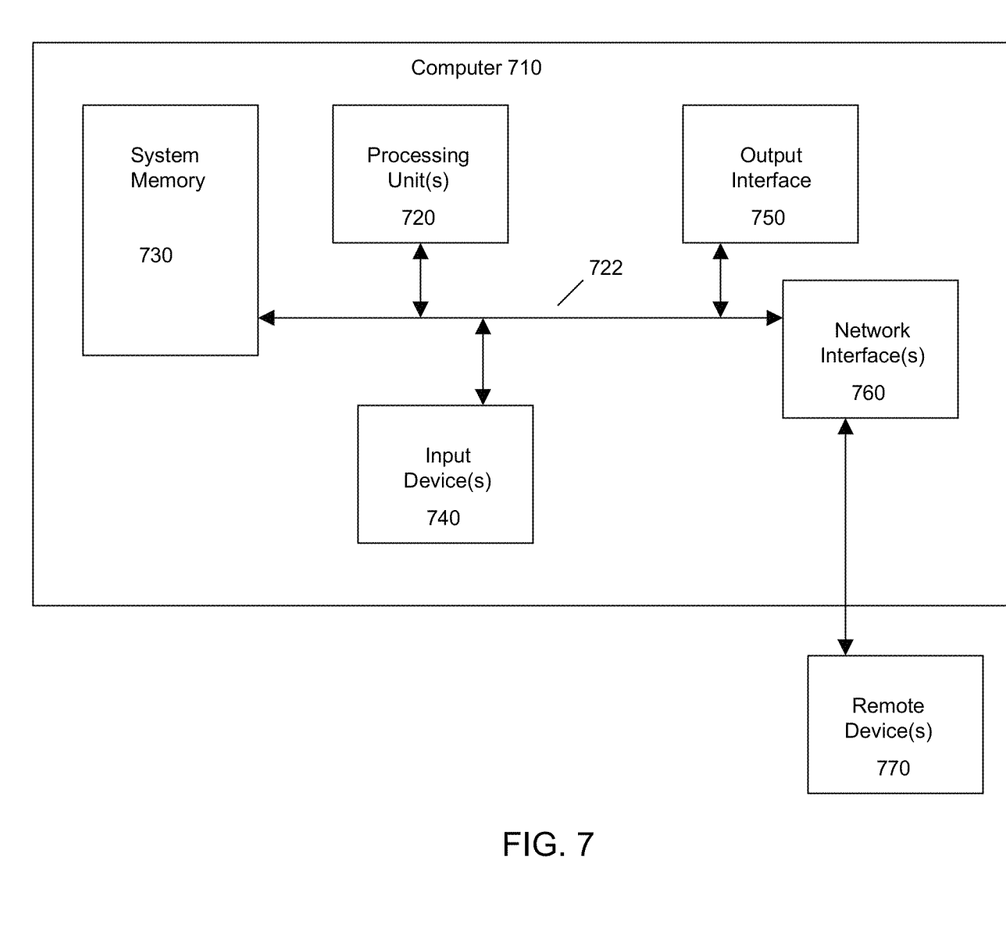
FIG. 7 illustrates an example computer system.

In this regard, referring now to FIG. 7, an example device that may be used in connection with one or more embodiments includes a computing device in the form of a computer 710. Components of computer 710 may include, but are not limited to, a processing unit 720, a system memory 730, and a system bus 722 that couples various system components including the system memory 730 to the processing unit 720. Computer 710 may include or have access to a variety of computer readable media. The system memory 730 may include computer readable storage media, for example in the form of volatile and/or nonvolatile memory such as read only memory (ROM) and/or random access memory (RAM). By way of example, and not limitation, system memory 730 may also include an operating system, application programs, other program modules, and program data.

A user can interface with (for example, enter commands and information) the computer 710 through input devices 740. A monitor or other type of device can also be connected to the system bus 722 via an interface, such as an output interface 750. In addition to a monitor, computers may also include other peripheral output devices. The computer 710 may operate in a networked or distributed environment using logical connections to one or more other remote device(s) 770 such as other computers. The logical connections may include network interface(s) 760 to a network, such as a local area network (LAN), a wide area network (WAN), and/or a global computer network, but may also include other networks/buses.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments have been described herein, it is to be understood that the embodiments are not limited to those precise embodiments, and that various other changes and modifications may be affected therein by one skilled in the art without departing from the scope or spirit of the disclosure.

What is claimed is:

1. A method for animation comprising:
   selecting key poses included in initial motion data at a computing system;
   obtaining non-humanoid character key poses which provide a one to one correspondence to selected key poses in said initial motion data; and
   statically mapping poses of said initial motion data in a first observational space to non-humanoid character poses in a second observation space using a model with shared latent space in a low dimensional space built based on said one to one correspondence from said key poses of said initial motion data to said non-humanoid character key poses;

wherein said model with shared latent space discovers and models space that represents a common causal structure between human and non-humanoid character motion.

2. The method according to claim 1, further comprising optimizing statically mapped data for a non-humanoid character to create a physically correct animated motion for said non-humanoid character.

3. The method according to claim 1, wherein said initial motion data is derived from one or more of: a motion capture system, and a key framing process.

4. The method according to claim 3, wherein the initial motion data is human motion capture data.

5. The method according to claim 1, wherein said selecting key poses included in said initial motion data is performed by a user operating an animation system.

6. The method according to claim 1, wherein said non-humanoid character key poses are derived from an external device.

7. The method according to claim 1, wherein said non-humanoid character key poses comprise key poses created by an animator collaborating with one or more actors.

8. The method according to claim 1, wherein said statically mapping further comprises learning a static mapping function from poses of said initial motion data to said non-humanoid character poses.

9. The method according to claim 8, wherein said model is a shared Gaussian process latent variable model.

10. The method according to claim 2, wherein said optimizing statically mapped data for a non-humanoid character further comprises one or more of:
    determining a global transformation of said non-humanoid character poses;
    correcting one or more contact positions; and
    optimizing physical realism of non-humanoid character motion by adjusting vertical motion to be consistent with gravity and a penalty-based contact model.

11. A computer program product comprising:
    a non-transitory computer readable storage medium having computer readable program code embodied therewith, the computer readable program code comprising:
    computer readable program code configured to access key poses selected from initial motion data;
    computer readable program code configured to access non-humanoid character key poses which provide a one to one correspondence to selected key poses in said initial motion data; and
    computer readable program code configured to statically map poses of said initial motion data in a first observational space to an non-humanoid character poses in a second observation space using a model with shared latent space in a low dimensional space built based on said one to one correspondence from said key poses of said initial motion data to said non-humanoid character key poses;
    wherein said model with shared latent space discovers and models space that represents a common causal structure between human and non-humanoid character motion.

12. The computer program product according to claim 11, further comprising computer readable program code configured to optimize statically mapped data for a non-humanoid character to create a physically correct animated motion for said non-humanoid character.

13. The computer program product according to claim 11, wherein said initial motion data is derived from one or more of: a motion capture system, and a key framing process.

14. The computer program product according to claim 12, wherein the initial motion data is human motion capture data.

15. The computer program product according to claim 12, wherein said mapping further comprises learning a static mapping function from poses of said initial motion data to said non-humanoid character poses.

16. The computer program product according to claim 15, wherein said model is a shared Gaussian process latent variable model.

17. The computer program product according to claim 12, wherein said optimizing statically mapped data for a non-humanoid character further comprises one or more of:
    determining a global transformation of said non-humanoid character poses;
    correcting one or more contact positions; and
    optimizing physical realism of non-humanoid character motion by adjusting motion of said non-humanoid character to be consistent with gravity and a penalty-based contact model.

18. The computer program product according to claim 17, further comprising computer readable program code configured to match linear and angular momenta of said non-humanoid character poses to poses obtained by scaling momenta in poses of said initial motion data.

19. The computer program product according to claim 17, wherein said optimizing physical realism of said non-humanoid character motion further comprises adjusting vertical motion of said non-humanoid character.

20. A system comprising:
    at least one processor; and
    a memory device operatively connected to the at least one processor;
    wherein, responsive to execution of program instructions accessible to the at least one processor, the at least one processor is configured to:
    access key poses selected from initial motion data;
    access non-humanoid character key poses which provide a one to one correspondence to selected key poses in said initial motion data; and
    statically map poses of said initial motion data in a first observational space to non-humanoid character poses in a second observation space using a model with shared latent space in a low dimensional space built based on said one to one correspondence from said key poses of said initial motion data to said non-humanoid character key poses;
    wherein said model with shared latent space discovers and models space that represents a common causal structure between human and non-humanoid character motion.

* * * * *